United States Patent [19]

Jenson et al.

[11] Patent Number: 4,815,630

[45] Date of Patent: Mar. 28, 1989

[54] FLUID TIGHT COVER SEAL

[75] Inventors: William M. Jenson; Robert W. Grant, both of Excelsior, Minn.

[73] Assignee: FSI Corporation, Chaska, Minn.

[21] Appl. No.: 160,650

[22] Filed: Feb. 26, 1988

[51] Int. Cl.$^4$ ............................................. B65D 83/00
[52] U.S. Cl. .................................................... 220/378
[58] Field of Search .................. 220/378; 277/22, 142, 277/160, 198

[56] References Cited

U.S. PATENT DOCUMENTS

| | | | |
|---|---|---|---|
| 2,948,959 | 8/1960 | Bowes | 220/378 |
| 3,352,447 | 11/1967 | Hahn | 220/378 |
| 4,053,085 | 10/1977 | Brown et al. | 220/378 |
| 4,361,252 | 11/1982 | Black et al. | 220/344 |

Primary Examiner—George T. Hall
Attorney, Agent, or Firm—Faegre & Benson

[57] ABSTRACT

A cover for a fluid processing chamber is formed of a resilient, heat and chemical resistant laminate of at least three layers. The first layer is a Teflon sheath, the second layer is a blanket heater, and the third layer is a plurality of thin sheets of silicone rubber. The laminate is formed by vacuum formation of the Teflon sheath onto the blanket heater which is supported by the silicone rubber. The opening to the chamber is formed with a rigid lip. The laminate is contained in a stainless steel housing which has an opening therein sized to encompass the perimeter of the chamber lip. Pressure on the cover housing achieves a fluid tight seal with the chamber. No fluid seeps between the cover and the lip even when processing requiring vigorous fluid agitation is carried out in the sealed chamber.

19 Claims, 2 Drawing Sheets

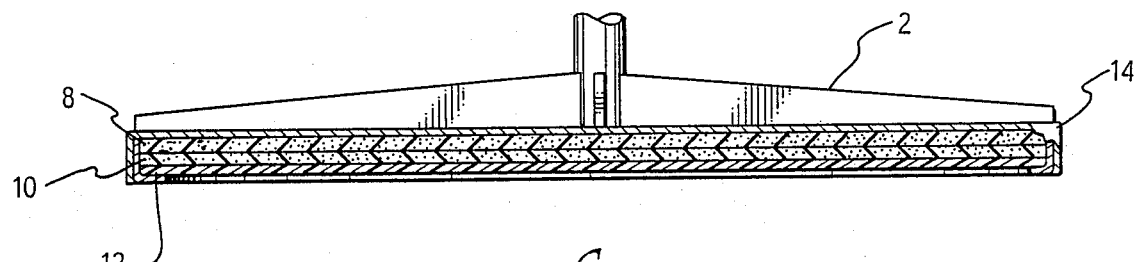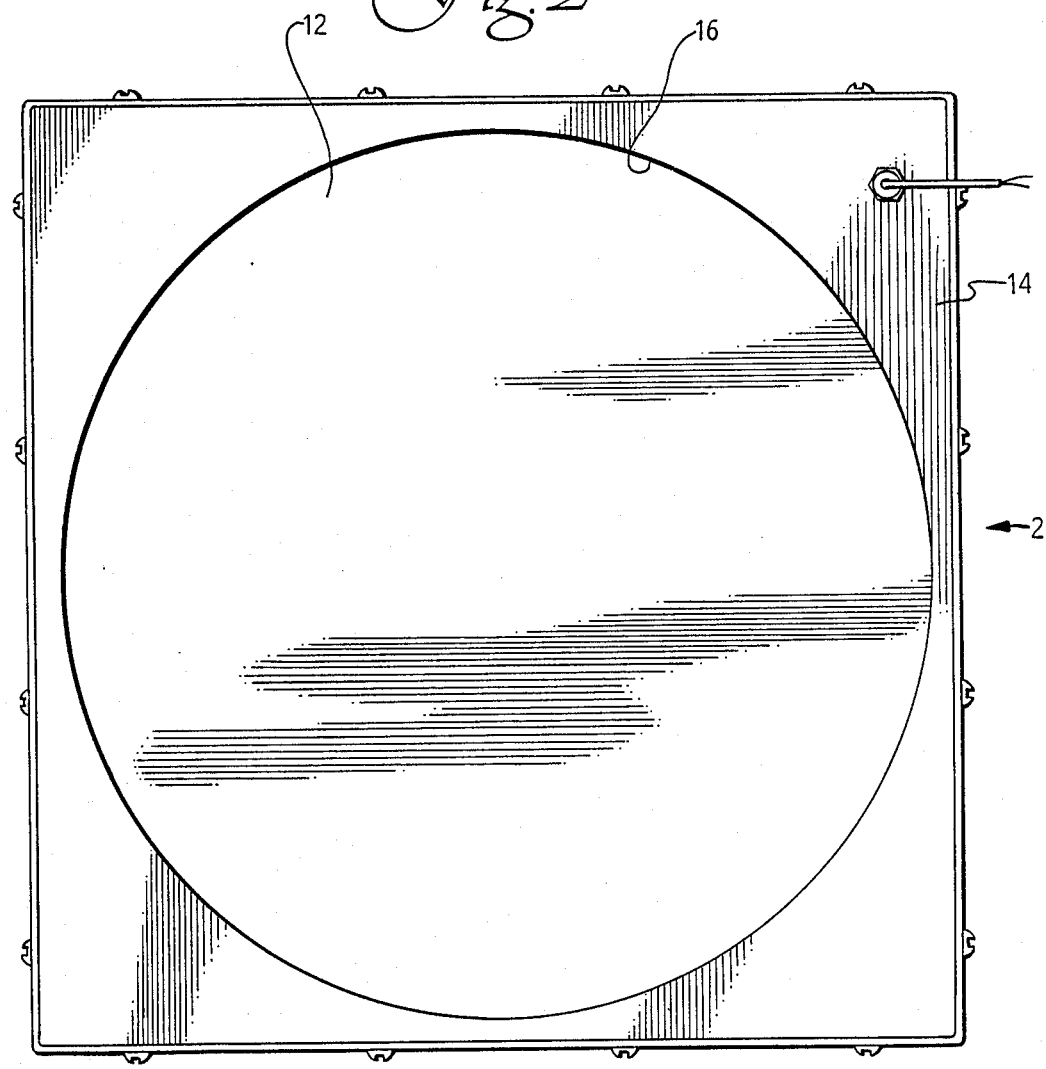

FLUID TIGHT COVER SEAL

BACKGROUND OF THE INVENTION

This invention relates to a cover for enclosing a chamber and its contents in a fluid-tight seal. More particularly, it relates to a cover comprised of at least three individual layers bonded together. This invention also relates to a fluid-tight vessel comprising the present novel cover and a chamber provided with an opening therefor formed with an upstanding lip defining the perimeter of the opening. Under externally applied pressure, the cover is able to form and maintain a resilient, fluid-tight seal with the rigid upstanding lip. This cover and the vessel employing this cover are suitable for a wide variety of uses where a fluid-tight seal for enclosing a chamber is required, particularly when contents of the chamber are to be subjected to vigorous fluid processing, extremes of heat, pressure and harsh chemicals while the fluid-tight seal on the chamber is maintained. The present cover and the vessel employing it are especially suited for such procedures as acid processing of substrates.

It is often necessary to conduct various industrial or laboratory fluid treatment procedures in a vessel which must be maintained in a secure and absolutely fluid-tight seal, often while procedures are being carried out therein involving the use of high speed rotating or revolving parts and extreme agitation, mixing or spraying of chemical fluids in all directions within the sealed vessel. For example, in the manufacturing of integrated circuits, the wafers or substrates from which the chips are cut are processed through various steps, including etching, cleaning, acid processing and the like, wherein the wafers or substrates are supported in a chamber which must be enclosed in a fluid-tight seal prior to initiating the required procedure.

Previously available technology achieves a fluid-tight seal between the cover and the chamber by using such arrangements as a precision fit lid, a rubber gasket, or an O-ring around the edge of the chamber. In the processing of wafers or substrates, after the particular fluid treatment procedure has been completed, it is necessary to dry the wafers or substrates to total dryness, usually by draining and vacuum aspiration of the fluid contents of the chamber, prior to releasing the fluid-tight seal and opening the chamber. Using the previously available means of achieving a fluid-tight seal, a ring of fluid often penetrated to the area between the lip of the chamber and the cover, where it remained resistant to drying procedures. Upon opening the chamber, this residual ring of fluid tended to recondense on the wafers or substrates, adversely affecting their condition and readiness for further processing steps.

SUMMARY OF THE INVENTION

According to the present invention, a cover for enclosing the opening of a chamber in a fluid-tight seal is provided which, under externally applied pressure, maintains the chamber and its contents in an extremely secure fluid-tight seal, preventing processing fluid from penetrating between the lip of the chamber and the cover. A vessel is also provided by this invention comprising this cover and a chamber having an upstanding lip defining the opening of the chamber.

The cover is comprised of at least three layers bonded together. The first layer is a resilient, pressure-deformable synthetic resin. The second layer is bonded to the first layer and comprises a means for heating the cover. The third layer is a synthetic rubber bonded to the second layer.

A chamber suitable for use with the cover of this invention is provided with an opening for the insertion and removal of its contents and the opening is formed with a rigid upstanding lip defining the perimeter thereof.

In order to enclose the chamber in a fluid-tight seal, the cover is placed over the opening of the chamber, with the first layer of the cover in contact with the rigid upstanding lip, and pressure is exerted on the cover, so that at least the first layer of the cover is slightly deformed by contact with the lip, thereby forming a fluid-tight seal with the chamber. The heating means in the second layer heats the cover, particularly the first layer thereof. After completing the fluid processing procedure in the chamber, the fluid contents are evacuated without removing the cover, for example, by draining and vacuum aspiration of the chamber. Upon release of the pressure on the cover and removal of the cover, the interior of the chamber, its substrate contents, the cover and particularly the confronting area between the cover and the lip of the chamber are entirely dry and free of any residual fluid. The resilient material of the cover returns to its original undeformed condition, even after repeated usage.

BRIEF DESCRIPTION OF THE DRAWINGS

FIG. 1 is a profile of the cover of this invention with parts cut away to show detail of the layers and a detail of the upstanding lip of the opening to the chamber contacting the first layer of the cover.

FIG. 2 is a top view of the cover enclosed in a housing showing the opening therein exposing the first layer of the cover.

DETAILED DESCRIPTION OF THE PREFERRED EMBODIMENTS

Figure 3:
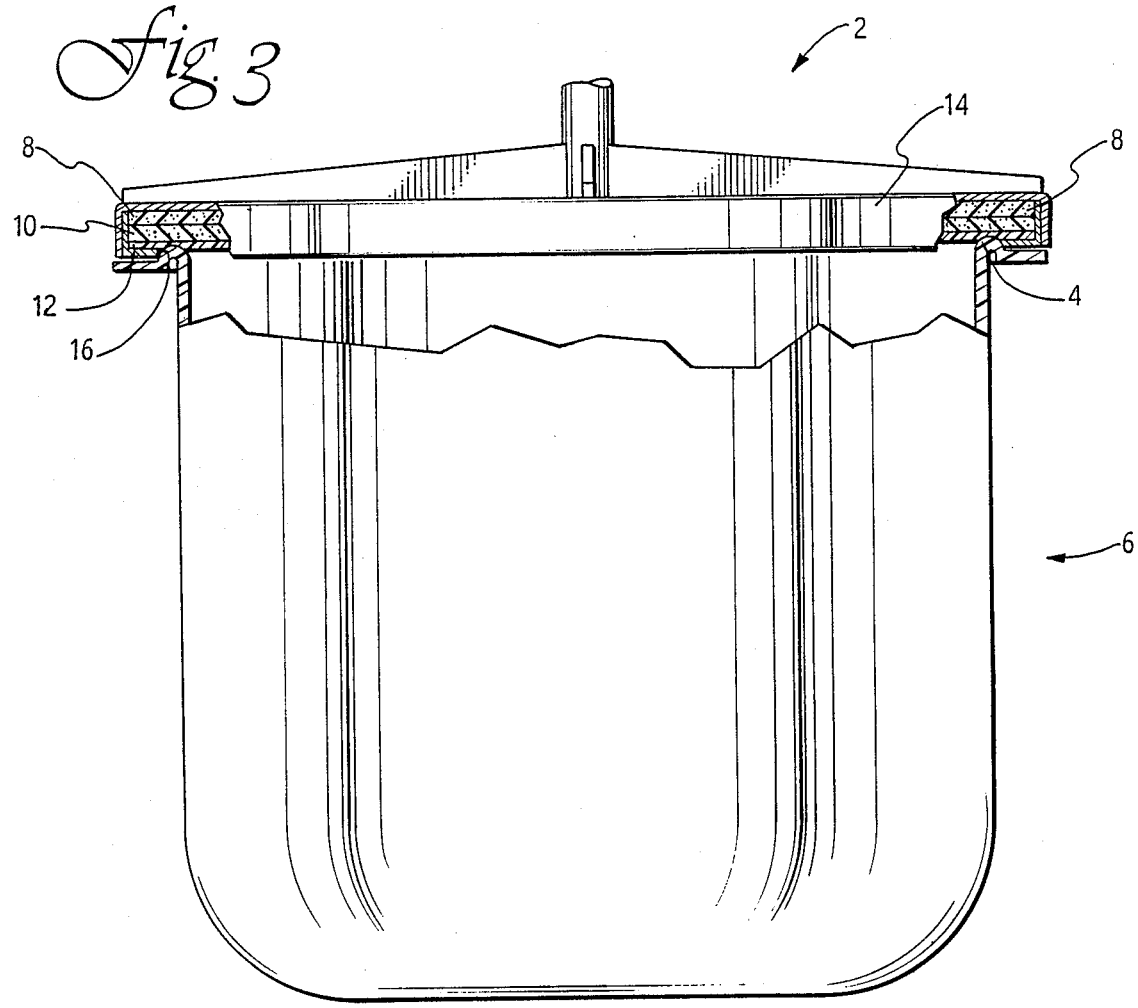
FIG. 3 is a profile of a chamber for use with the cover of this invention, showing the upstanding lip of the opening and illustrating optional equipment for supporting substrates therein.

Th three layers of the cover are preferably formed of heat and chemical resistant materials. The first layer is preferably formed of a perfluoroalkylene synthetic resin such as Teflon PFA, Teflon FEP or Teflon TFE. The second layer is formed of a heating coil which serves to heat the first layer when the cover is in fluid-tight sealing relationship with the chamber, in order to prevent unwanted condensation of fluid on the first layer. The first layer is suitably vacuum formed onto the second heating layer. The third layer is preferably formed of silicone rubber, and may if desired by formed of a plurality of thin lamina of silicone rubber. The third layer is designed to provide heat insulation for the cover and to further cooperate in forming the resilient, pressure-deformable fluid-tight seal of the cover with the upstanding lip of the chamber when pressure is exerted on the cover. The cover is suitably further enclosed in a rigid housing, provided with an opening therein sized to enclose the perimeter of the lip of the chamber, with the first layer exposed by the opening in the housing. The housing may be formed of stainless steel and pressure on the cover may be maintained by exerting pressure on the housing, generally by pneumatic compression. The total force to be exerted on the lid should be sufficient to ensure a fluid tight seal, generally in the range of between about 100–140 psig.

The chamber may be of any shape or configuration suitable for containing fluids only or solid materials to be subjected to fluid processing therein. The only requirement of the chamber is that it be formed with an upstanding lip defining the opening to the interior thereof for containing the first layer of the cover in fluid-tight sealing relationship. When the chamber is to be used for fluid processing of substrates, it may suitably be according to the type shown in U.S. Pat. Nos. 3,990,462 or 4,132,567, and may be of for example perfluoroalkylene, polyvinyl chloride or perfluoroalkoxy alkylene. When a vessel employing the cover of this invention is used in acid processing of substrates, drying of the substrates is 40% faster than with previously available sealing means and no residual processing fluid collects between the rim of the chamber and the cover.

Referring now to the drawings, FIG. 1 is a profile of the cover 2 of this invention with parts cut away to show detail of the layers and a detail of the upstanding lip 4 of the opening to the chamber 6. The third layer 8 is of a heat resistant resilient foam and may be formed of a plurality of thin lamina for increased heat insulating value. Preferably the third layer 8 is a synthetic rubber, such as silicone rubber. The thickness of the third layer 8 may suitably be between about 0.12–1.00 inch. The second layer 10 is a heating means bonded to the third layer 8, such as a heating coil, for heating the cover 2, especially the first layer 12 thereof. The first layer 12 is a resilient, pressure-deformable synthetic resin bonded to the second layer 10. Preferably, the first layer 12 is a perfluoroalkylene vacuum formed on the second layer. The first layer 12 is designed to provide resiliency to the cover 2 to aid in forming the inert fluid-tight seal and also to provide a surface inert to chemical, pressure and heat deterioration from contact with the environment in the interior of the chamber 6. The thickness of the first layer 12 can suitably be between about 0.02–0.20 inch.

As shown in FIG. 1, the cover may suitably be enclosed in a housing 14 which is provided with an opening therein 16 sized to enclose the perimeter of the lip 4 of the chamber 6.

FIG. 2 is a top view of the cover 2 enclosed in a housing 14 showing the opening therein 16 exposing the first layer 12.

FIG. 3 is a profile of a chamber 6 for use with the cover 2 of this invention, showing the upstanding lip 4 of the opening. Optional equipment for supporting substrates may be of the type illustrated in U.S. Pat. Nos. 3,990,462 and 4,132,567.

Figure 4:
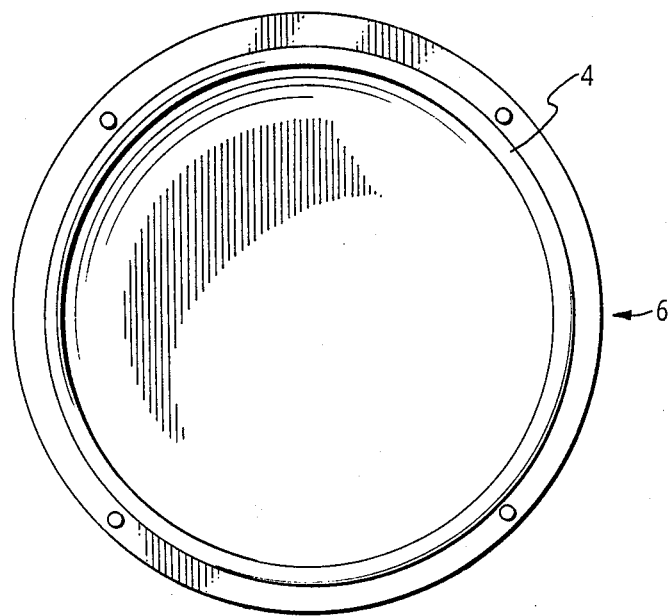
FIG. 4 is a top view looking down into the interior of the chamber for use with the cover of this invention.
Figure 5:
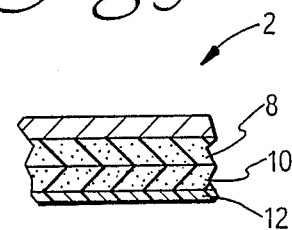
FIG. 5 is an enlarged view of the layers of the cover.

FIG. 4 is a top view looking down into the interior of the chamber 6 for use with the cover 2 of this invention.

Having thus described our invention in terms of an illustrative embodiment therefore, it is not our intention that the present invention should be considered to be limited except as defined by the following claims.

What is claimed is:

1. A cover for enclosing an opening of a chamber in a fluid-tight seal comprising:
    at least three layers, a first layer of a resilient, pressure-deformable synthetic resin, a second layer bonded to the first layer and comprising a means for heating the cover and the chamber, and a third layer of synthetic rubber bonded to the second layer;
    the opening of the chamber formed with a rigid upstanding lip defining the perimeter thereof for confronting the first layer of the cover;
    such that when the lip contacts the first layer of the cover and pressure is exerted on the cover to enclose the opening of the chamber, at least the first layer of the cover is slightly deformed by contact with the lip, thereby forming a fluid-tight seal with the chamber, preventing fluid from between the lip of the chamber and the cover.

2. The cover of claim 1, wherein the chamber is adapted to contain fluids and substrates supported primarily by their edges in spaced apart relationship for fluid processing thereof.

3. The cover of claim 1, wherein the first layer is perfluoroalkylene.

4. The cover of claim 1, wherein the third layer is silicone rubber.

5. The cover of claim 1, wherein the third layer is comprised of at least two lamina of silicone rubber.

6. The cover of claim 1, wherein the first layer is vacuum formed onto the second layer.

7. The cover of claim 1 further enclosed in a stainless steel housing, provided with an opening therein sized to enclose the perimeter of the lip of the chamber, with the first layer exposed by the opening in the housing, and pressure on the cover is maintained by exerting pressure on the housing.

8. The cover of claim 1, wherein the chamber is perfluoroalkylene, polyvinyl chloride or perfluoroalkyoxy alkylene.

9. The cover of claim 1, wherein the chamber is adapted for acid processing of substrates.

10. A vessel for enclosing contents in a fluid-tight seal comprising;
    a chamber with an opening therein for insertion and removal of contents and formed with a rigid upstanding lip defining the perimeter thereof; and
    a cover for enclosing the opening of the chamber in a fluid-tight seal comprised of at least three layers, a first layer of a resilient, pressure-deformable synthetic resin, a second layer bonded to the first layer and comprising a means for heating the cover, and a third layer of synthetic rubber bonded to the second layer;
    such that when the lip contacts the first layer of the cover and pressure is exerted on the cover to enclose the opening of the chamber, at least the first layer of the cover is slightly deformed by contact with the lip, thereby forming a fluid-tight seal with the chamber, preventing fluid from penetrating between the lip of the chamber and the cover.

11. The vessel of claim 10, wherein the chamber is adapted to support the substrates primarily by their edges in spaced apart relationship for fluid processing thereof.

12. The vessel of claim 10, wherein the first layer is perfluoroalkylene.

13. The vessel of claim 10, wherein the third layer is silicone rubber.

14. The vessel of claim 10, wherein the third layer is comprised of at least two lamina of silicone rubber.

15. The vessel of claim 10, wherein the first layer is vacuum formed onto the second layer.

16. The vessel of claim 10, wherein the cover is enclosed in a stainless steel housing, provided with an opening therein sized to enclose the perimeter of the lip of the chamber, with the first layer exposed by the opening in the housing, and pressure on the cover is maintained by exerting pressure on the housing.

17. The vessel of claim 10, wherein the chamber is perfluoroalkylene, polyvinyl chloride or perfluoroalkoxy alkylene.

18. The vessel of claim 10, wherein the chamber is adapted for acid processing of substrates.

19. A vessel for fluid processing of substrates comprising a chamber for fluid processing of substrates and a cover for enclosing the chamber in a fluid-tight seal, wherein:

the chamber is provided with an opening therein for insertion and removal of substrates, is adapted to support the substrates primarily by their edges in a spaced apart relationship, said opening being formed with a rigid upstanding lip defining the perimeter thereof; and the cover is comprised of a laminate of at least three layers, a first layer of a resilient, pressure-deformable, acid and heat resistant synthetic resin, a second layer of a means for heating the cover, and a third layer of a synthetic rubber, the laminate being enclosed in a housing, which is provided with an opening therein sized to enclose the perimeter of the lip of the chamber, with the first layer exposed by the opening in the housing;

such that when the lip contacts the first layer of the laminate of the cover and pressure is exerted on the housing to enclose the opening of the chamber, at least the first layer of the cover is slightly deformed by contact with the lip, thereby forming a fluid-tight seal with the chamber, preventing fluid from penetrating between the lip of the chamber and the cover.

* * * * *

UNITED STATES PATENT AND TRADEMARK OFFICE
CERTIFICATE OF CORRECTION

PATENT NO.  : 4,815,630

DATED       : March 28, 1989

INVENTOR(S) : William M. Jenson and Robert W. Grant

It is certified that error appears in the above-identified patent and that said Letters Patent is hereby corrected as shown below:

Claim 1, line 17, after "from" insert -- penetrating --.

Signed and Sealed this

Fourteenth Day of November, 1989

Attest:

JEFFREY M. SAMUELS

Attesting Officer    Acting Commissioner of Patents and Trademarks